United States Patent [19]
Miyazaki

[11] Patent Number: 6,124,976
[45] Date of Patent: Sep. 26, 2000

[54] VOLTAGE CONTROLLING METHOD FOR HEAD MOUNTED DISPLAY UNIT AND HEAD MOUNTED DISPLAY APPARATUS

[75] Inventor: Kazumasa Miyazaki, Tokyo, Japan

[73] Assignee: Sony Corporation, Tokyo, Japan

[21] Appl. No.: 09/267,265

[22] Filed: Mar. 12, 1999

[30] Foreign Application Priority Data

Mar. 17, 1998 [JP] Japan ................................. 10-066547

[51] Int. Cl.⁷ .................................................. G02B 27/14
[52] U.S. Cl. ............................... 359/630; 359/629; 345/7
[58] Field of Search ................................. 359/630, 629; 345/7, 8

[56] References Cited

U.S. PATENT DOCUMENTS

| | | | |
|---|---|---|---|
| 5,491,492 | 2/1996 | Knapp et al. | 345/8 |
| 5,835,083 | 11/1998 | Nielsen et al. | 345/211 |
| 6,005,536 | 12/1999 | Beadles et al. | 345/7 |

*Primary Examiner*—Georgia Epps
*Assistant Examiner*—Timothy Thompson
*Attorney, Agent, or Firm*—Limbach & Limbach LLP

[57] ABSTRACT

The invention provides a head mounted display apparatus and a voltage controlling method for the head mounted display apparatus by which supply of a power supply voltage to circuit components is controlled to reduce the power consumption. The head mounted display apparatus includes an image displaying section for being mounted on the head of a user and positioned in front of the eyes of the user, a power supply section for supplying a power supply voltage, and a control section for controlling the power supply voltage to be supplied from the power supply section. Whether or not the eyes of the user look away from an image formed by the image displaying section is detected from a portion of the head of user in the proximity of the eyes, and, when it is detected that the eyes of the user look away from the image display section, the supply of the power supply voltage to the image displaying section is interrupted while the detection operation remains operative by continued supply of the power supply voltage.

6 Claims, 8 Drawing Sheets

VOLTAGE CONTROLLING METHOD FOR HEAD MOUNTED DISPLAY UNIT AND HEAD MOUNTED DISPLAY APPARATUS

BACKGROUND OF THE INVENTION

1. Field of the Invention

This invention relates to a voltage controlling method for a head mounted display unit and a head mounted display apparatus, and more particularly to a voltage controlling method and apparatus for a portable head mounted display unit which is driven by a battery and can be used for a long period of time with low power consumption.

2. Description of the Related Art

Figure 5:
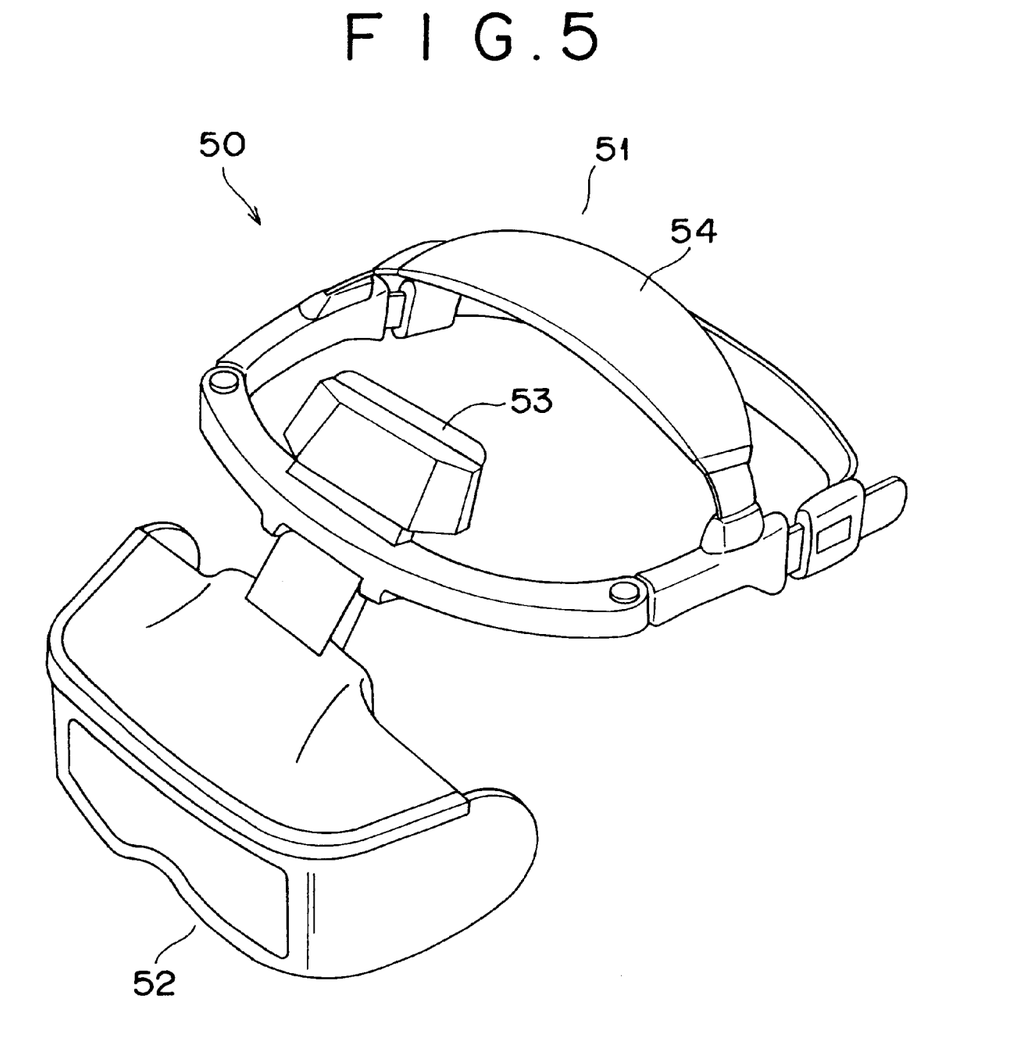
FIG. 5 is a schematic view showing a head mounted display apparatus of another type to which the present invention can be applied.

A conventional head mounted display apparatus as shown in FIG. 5, has a form like eyeglasses and is mounted on the head of a user with a pair of temples thereof suspended on the ears of the user such that an image displaying housing is positioned in front of the eyes of the user.

Figure 12:
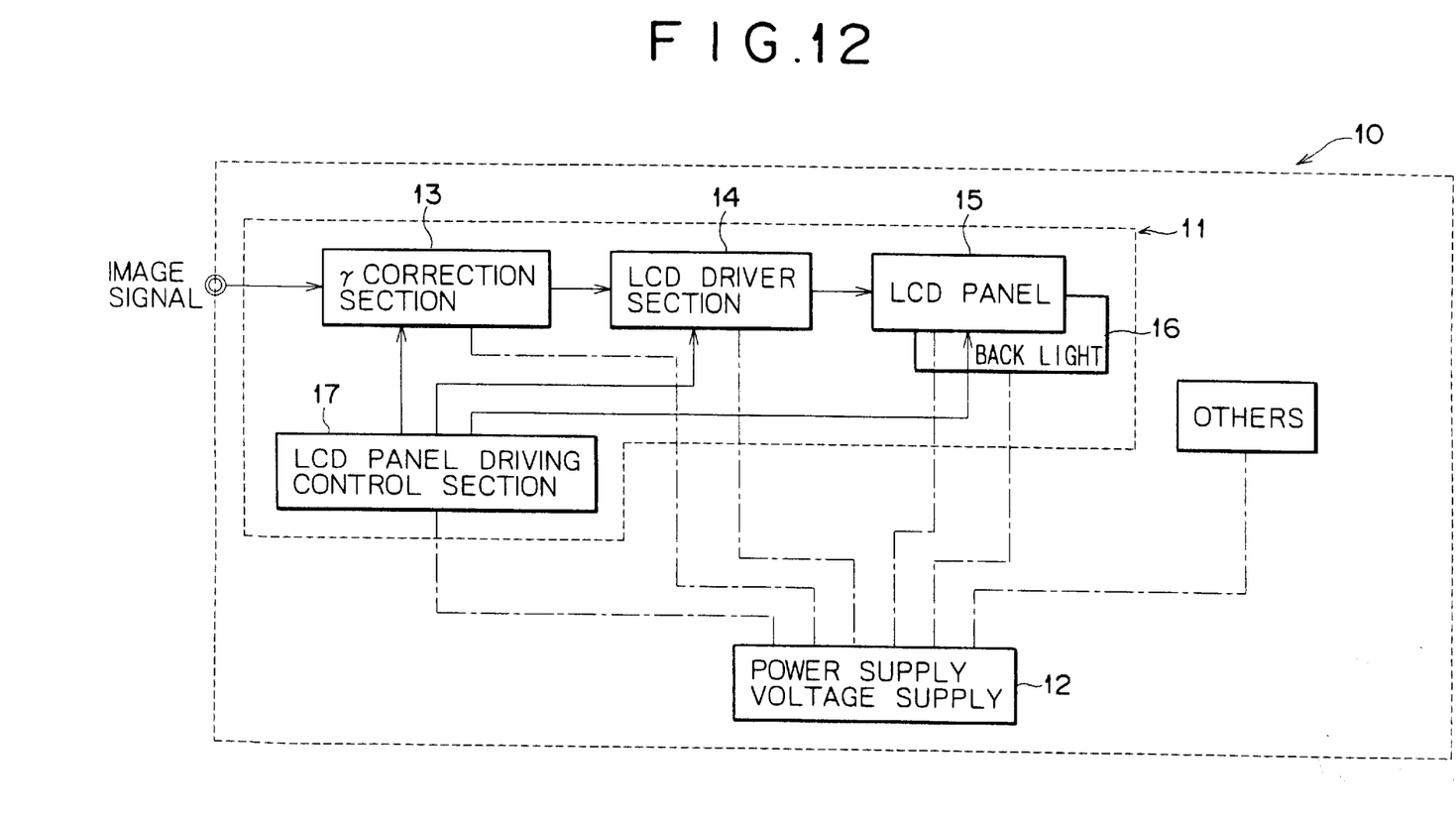
FIG. 12 is a block diagram showing a construction of an image displaying housing of a conventional head mounted display apparatus.

FIG. 12 shows a construction of an image displaying housing of such a conventional head mounted display apparatus as mentioned above. Referring to FIG. 12, the image displaying housing 10 includes an image displaying section 11 for forming an image to be displayed, and a power supply voltage section 12 for supplying a power supply voltage to the image displaying section 11 and other components of the image displaying housing 10 which are not particularly shown in FIG. 10.

The image displaying section 11 includes a γ correction section 13 for receiving an image signal and performing γ correction of the received image signal, an LCD driver section 14 for converting a signal from the γ correction section 13 into an ac driving signal, an LCD panel 15 for forming and displaying an image based on the signal from the LCD driver section 14, a back light 16 for irradiating light upon the LCD panel 15 from the back, and an LCD panel driving control section 17 for controlling the image to be formed.

In the image displaying section 11 which includes the components described above, if a power supply switch not shown is switched on, then a power supply voltage from the power supply voltage section 12 is supplied to the components of the image displaying section 11. Thus, when the power supply is on intentionally, the power supply voltage is supplied to all of the component circuits of the image displaying section 11 to display an image on the LCD panel 15 irrespective of whether the user looks at the LCD panel 15 of the image displaying section 11 or not.

However, even when the user intentionally looks away from the image displayed on the LCD panel, the power supply voltage is supplied to all of the component circuits of the image displaying section. Therefore, the circuit construction of the image displaying section of the conventional head mounted display apparatus has a problem in that, when the user wants to enjoy a displayed image as long as possible while the head mounted display apparatus is driven by a battery, the power supply must be switched off frequently every time.

SUMMARY OF THE INVENTION

It is an object of the present invention to provide a voltage controlling method for a head mounted display unit and a head mounted display apparatus by which supply of a power supply voltage to circuit components necessary to form an image to be displayed can be automatically stopped.

In order to attain the object described above, according to an aspect of the present invention, there is provided a power supply voltage controlling method for a head mounted display unit which includes an image displaying section for being mounted on the head of a user and positioned in front of the eyes of the user, a power supply section for supplying a power supply voltage, and a control section for controlling the power supply voltage to be supplied from the power supply section, comprising the steps of detecting whether or not the eyes of the user look away from the image displaying section, and interrupting, when it is detected that the eyes of the user look away from the image displaying section, the supply of the power supply voltage to the image displaying section while the detection operation in the detecting step remains operative by continued supply of the power supply voltage.

According to another aspect of the present invention, there is provided a head mounted display apparatus, comprising an image displaying section for being mounted on the head of a user and positioned in front of the eyes of the user, a power supply section for supplying a power supply voltage, a control section for controlling the power supply voltage to be outputted from the power supply section, and detection means for detecting whether or not the eyes of the user look away from the image displaying section, the control means controlling the power supply section to interrupt, when the detection means detects that the eyes of the user look away from the image displaying section, the supply of the power supply voltage to the image displaying section while continuing the supply of the power supply voltage to the detection means.

With the voltage controlling method for a head mounted display unit and the head mounted display apparatus, when it is detected that the eyes of the user look away from an image displayed by the image displaying section, power supply is switched such that the supply of the power supply voltage to the image displaying section is interrupted while the detection operation remains operative by continued supply of the power supply voltage. Consequently, the power supply of the entire head mounted display unit or apparatus can be reduced. Consequently, even where the head mounted display apparatus is driven by a battery, use of the apparatus for a longer period of time can be anticipated.

The above and other objects, features and advantages of the present invention will become apparent from the following description and the appended claims, taken in conjunction with the accompanying drawings in which like parts or elements denoted by like reference symbols.

DESCRIPTION OF THE PREFERRED EMBODIMENTS

Hereinafter some preferred embodiments of the voltage controlling method for head mounted display unit and head mounted display apparatus according to present invention will be described in detail with reference to FIG. 1 to FIG. 12.

Figure 1:
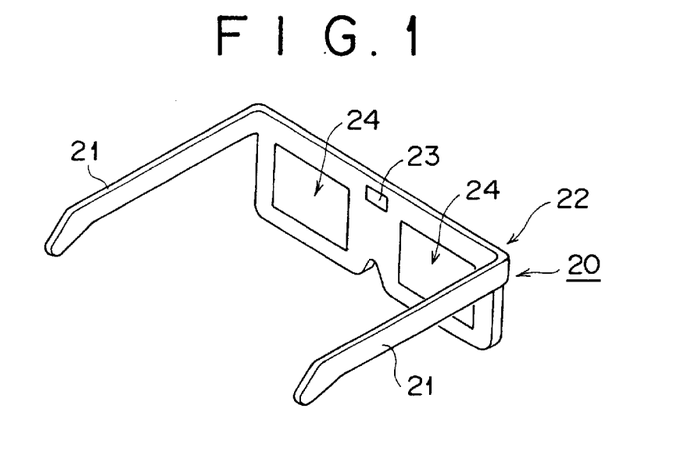
FIG. 1 is a schematic perspective view of an entire head mounted display apparatus to which the present invention is applied.

Referring first to FIG. 1, there is shown a head mounted display apparatus to which the present invention is applied. The head mounted display apparatus 20 shown has a form like eyeglasses as shown in FIG. 1 and includes a pair of temples 21 for being suspended on the ears of the user to mount the head mounted display apparatus on the head of the user, and an image displaying housing 22 positioned in front of the eyes of the user when the head mounted display apparatus is mounted on the head of the user.

Figure 9:
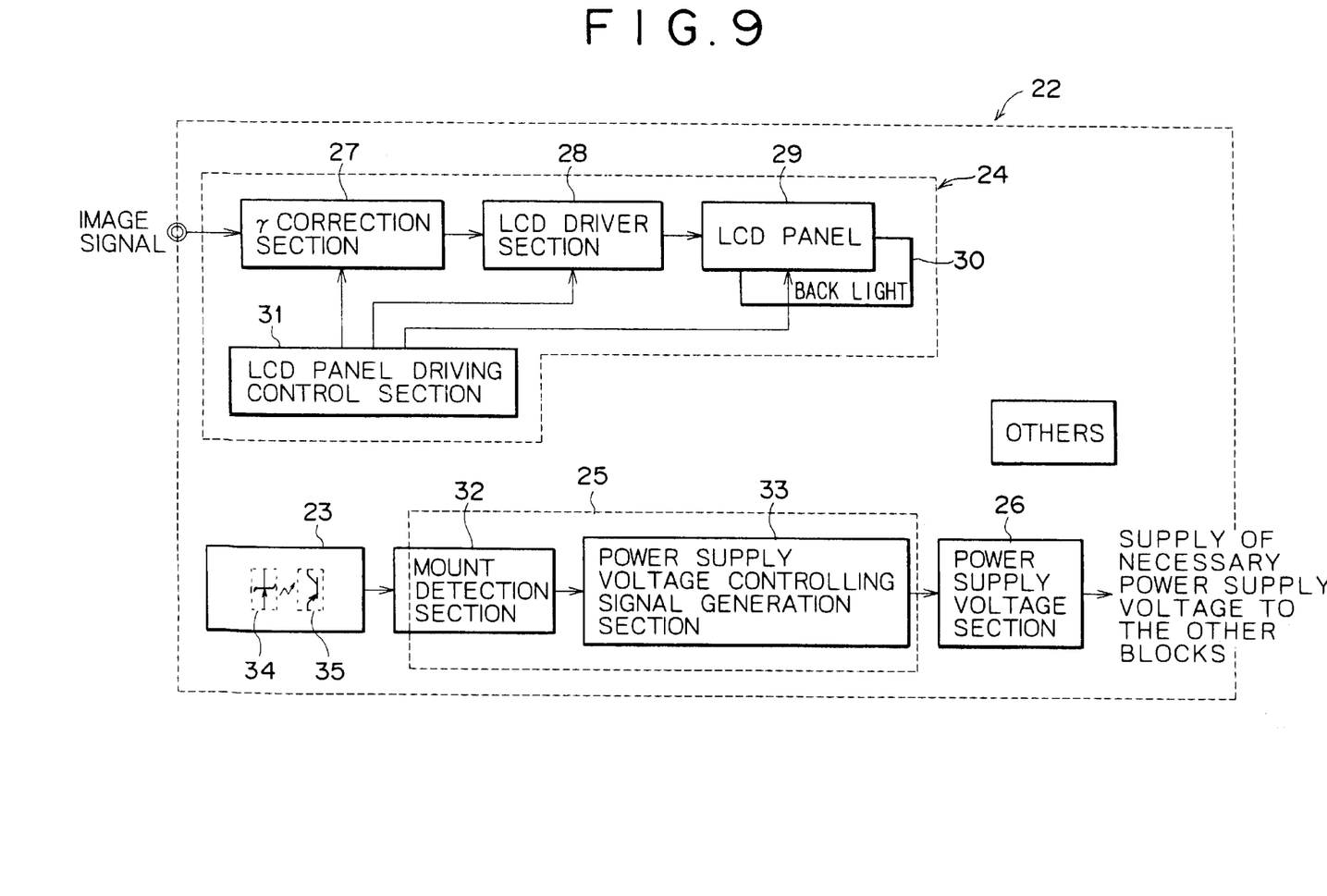
FIG. 9 is a block diagram showing a construction of an image displaying housing of a head mounted display apparatus according to the present invention.

Referring also to FIG. 9, the image displaying housing 22 includes a sensor section 23 for being positioned in the proximity of the eyes of the user, particularly in the proximity of the forehead of the user and serving as detection means for detecting a mounted condition of the head mounted display apparatus, a pair of image displaying sections 24 positioned in front of the eyes of the user when the head mounted display apparatus is mounted on the head of the user, a power supply voltage section 26 for supplying a power supply voltage to necessary circuit components of the image displaying housing 22, and a voltage control section 25 for controlling the power supply voltage of the power supply voltage section 26 in response to a detection signal from the sensor section 23.

Each of the image displaying sections 24 includes a γ correction section 27 for receiving an image signal as an input thereto and performing γ correction of the image signal, an LCD driver section 28 for converting a signal from the γ correction section 27 into an ac driving signal, an LCD panel 29 for forming an image based on the signal from the LCD driver section 28, a back light 30 for irradiating light upon the LCD panel 29 from the back, and an LCD panel driving control section 31 for controlling the image to be formed by the LCD panel 29 in accordance with a control signal synchronized with the image signal.

The voltage control section 25 includes a mount detection section 32 for detecting a mounted condition of the head mounted display apparatus from a signal from the sensor section 23, and a power supply voltage controlling signal generation section 33 for controlling the power supply voltage of the power supply voltage section 26 in response to a signal detected by the mount detection section 32.

The sensor section 23 is provided at a position of the image displaying housing 22 at which the forehead of the user contacts with the image displaying housing 22 (refer to FIG. 1) when the head mounted display apparatus is mounted on the head of the user as described above, and includes a light emitting element 34 for emitting an infrared signal, and a light receiving element 35 for receiving the infrared signal. Detection by the sensor section 23 is performed such that, when the user looks at an image formed by the head mounted display apparatus, the infrared ray from the light emitting element 34 strikes and is reflected onto the forehead and the reflected light from the forehead is received by the light receiving element 35. Accordingly, when the user does not look at a displayed image, that is, when the user looks away from a displayed image, the positional relationship between the forehead and the sensor section 23 is such that they are a little spaced away or displaced from each other, as different from that in a condition wherein the user looks at the displayed image. Accordingly, the infrared signal irradiated upon the forehead is either not reflected onto the forehead or reflected but in a somewhat disordered manner, and the light receiving element 35 either receives no reflected light or receives somewhat disorderly reflected light. In this manner, whether or not the displayed image is observed with the eyes of the user can be detected by detecting the received condition of the infrared ray from a condition of motion of a portion the user's body in the proximity of the eyes such as, for example, the forehead.

The detection of whether or not a displayed image is observed by the eyes of the user is not limited to the detection from a reflection condition of an infrared signal. In particular, if the head mounted display apparatus is constructed otherwise such that a pad is pressed against the forehead of the user when the user observes a display image, the pressure condition of the pad should be detected to detect whether or not the eyes of the user look away from the image.

FIG. 5 and FIGS. 6 to 8 show different head mounted display apparatus which includes such a pad as described above. Referring first to FIG. 5, the head mounted display apparatus 50 includes an adjustable mounting section 51 having a generally ring-like shape for adjustably mounting the head mounting display apparatus 50 on the head of a user, and a display section 52 for being positioned in front of the eyes of the user when the head mounted display apparatus 50 is mounted on the head of the user.

The mounting section 51 includes a first pad 53 for being pressed against the forehead of the user or a portion of the head a little above the forehead, and a second pad 54 for being pressed against the top of the head of the user. The sensor section as detection means for detecting a mounted condition of the head mounted display apparatus 50 may be mounted on the first pad 53 and/or the second pad 54, preferably on the first pad.

It is to be noted that the structure and operation of the mounting section for mounting the head mounted display apparatus 50 on the head of a user has no relationship to the subject matter of the present invention, description of it is omitted. This also applies to the head mounted display apparatus described below with reference to FIGS. 6 to 8.

Figure 6:
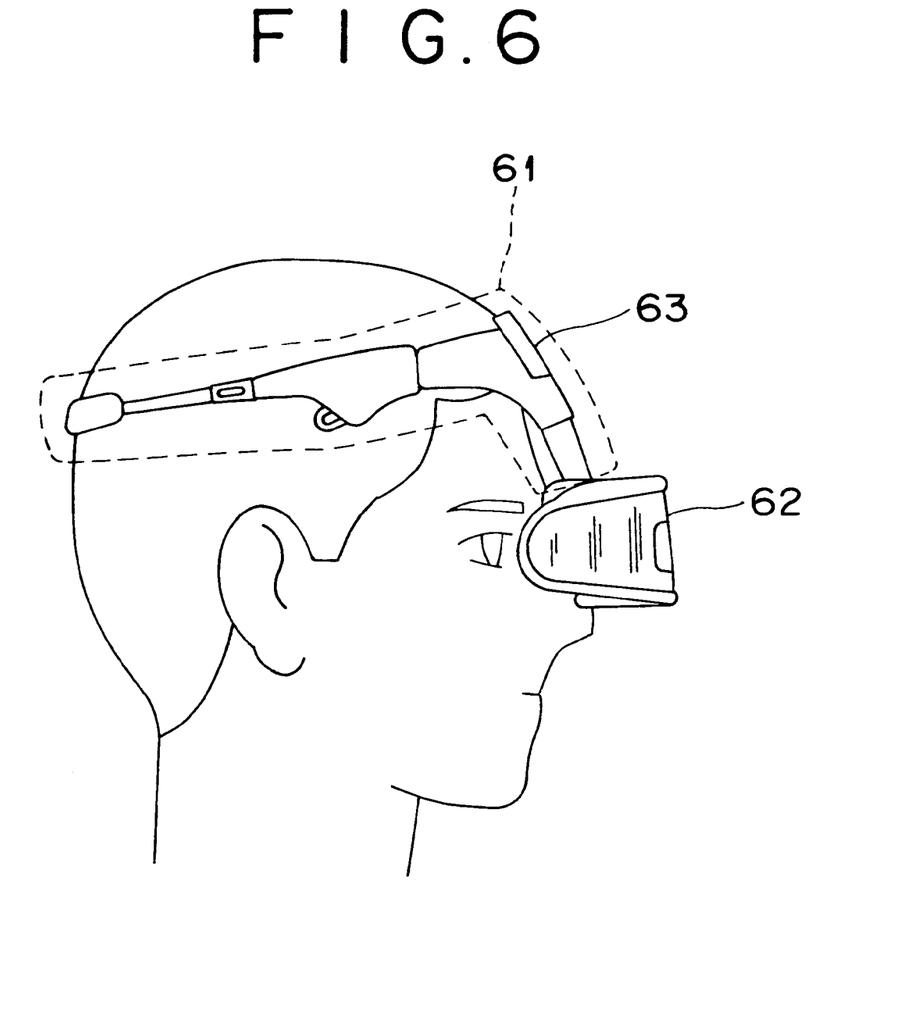
FIG. 6 is s schematic side elevational view showing a head mounted display apparatus of a further type to which the present invention can be applied when the head mounted display apparatus is mounted on the head of a user.
Figure 7:
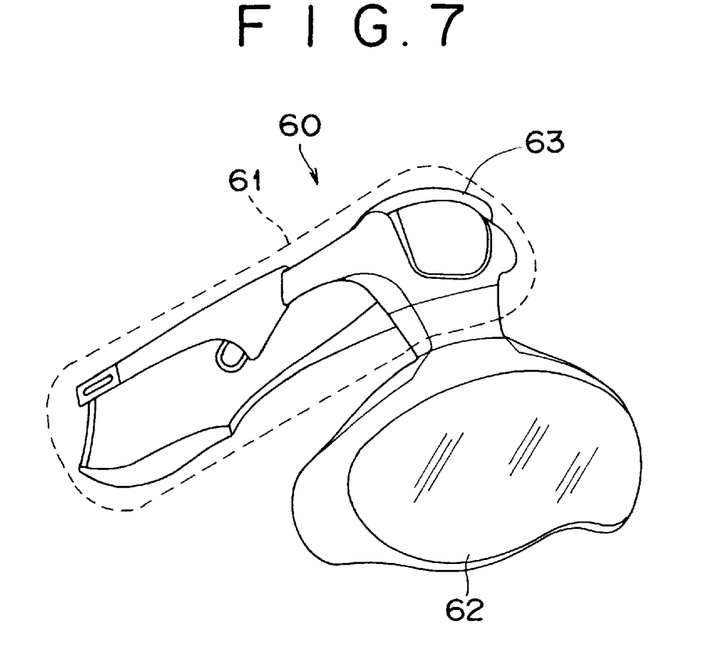
FIGS. 7 and 8 are schematic perspective views showing the head mounted display apparatus of FIG. 6 in different postures.
Figure 8:
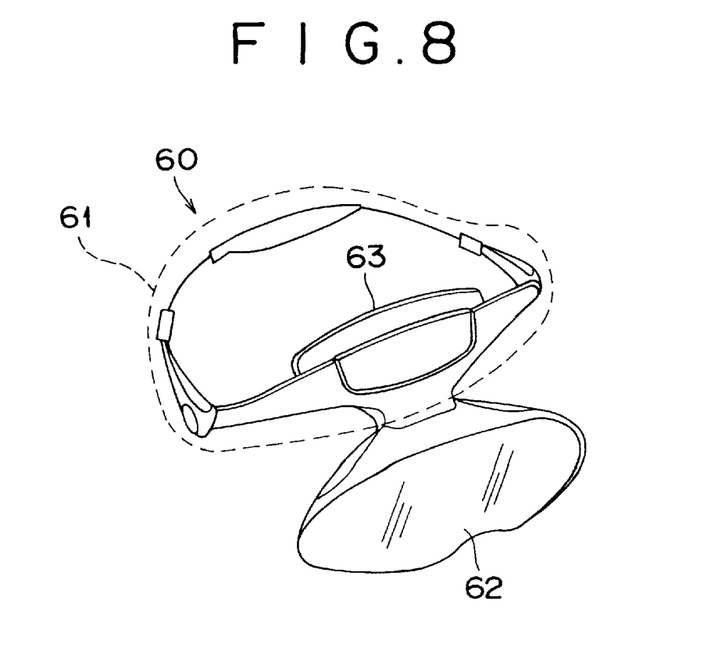

Referring now to FIGS. 6 to 8, the head mounted display apparatus shown is generally denoted at 60 and includes an adjustable mounting section 61 having a generally ring-like shape for adjustably mounting the head mounting display apparatus 60 on the head of a user, and a display section 62 for being positioned in front of the eyes of the user when the head mounted display apparatus 60 is mounted on the head of the user.

The mounting section 61 includes a pad 63 for being pressed against the forehead of the user. The sensor section as detection means for detecting a mounted condition of the head mounted display apparatus 60 may be mounted on the pad 63. Thus, when the head mounted display apparatus 60 is mounted on the head of the user in such a manner as shown in FIG. 6 (also the head mounted display apparatus 50 described hereinabove with reference to FIG. 5 is mounted in a similar manner on the head of the user), the sensor section is pressed against the forehead of the user and can detect the thus mounted condition.

The sensor section serving as detection means for detecting a mounted condition of the head mounted display apparatus, that is, for detecting whether or not the user looks at a displayed image as described above should be constructed with attention paid to the eyes which look at a displayed image so that a movement in the proximity of the eyes of the user may be detected. In short, the detection means is required to be constructed only such that it can discriminate whether or not a displayed image is observed by the eyes.

Figure 10:
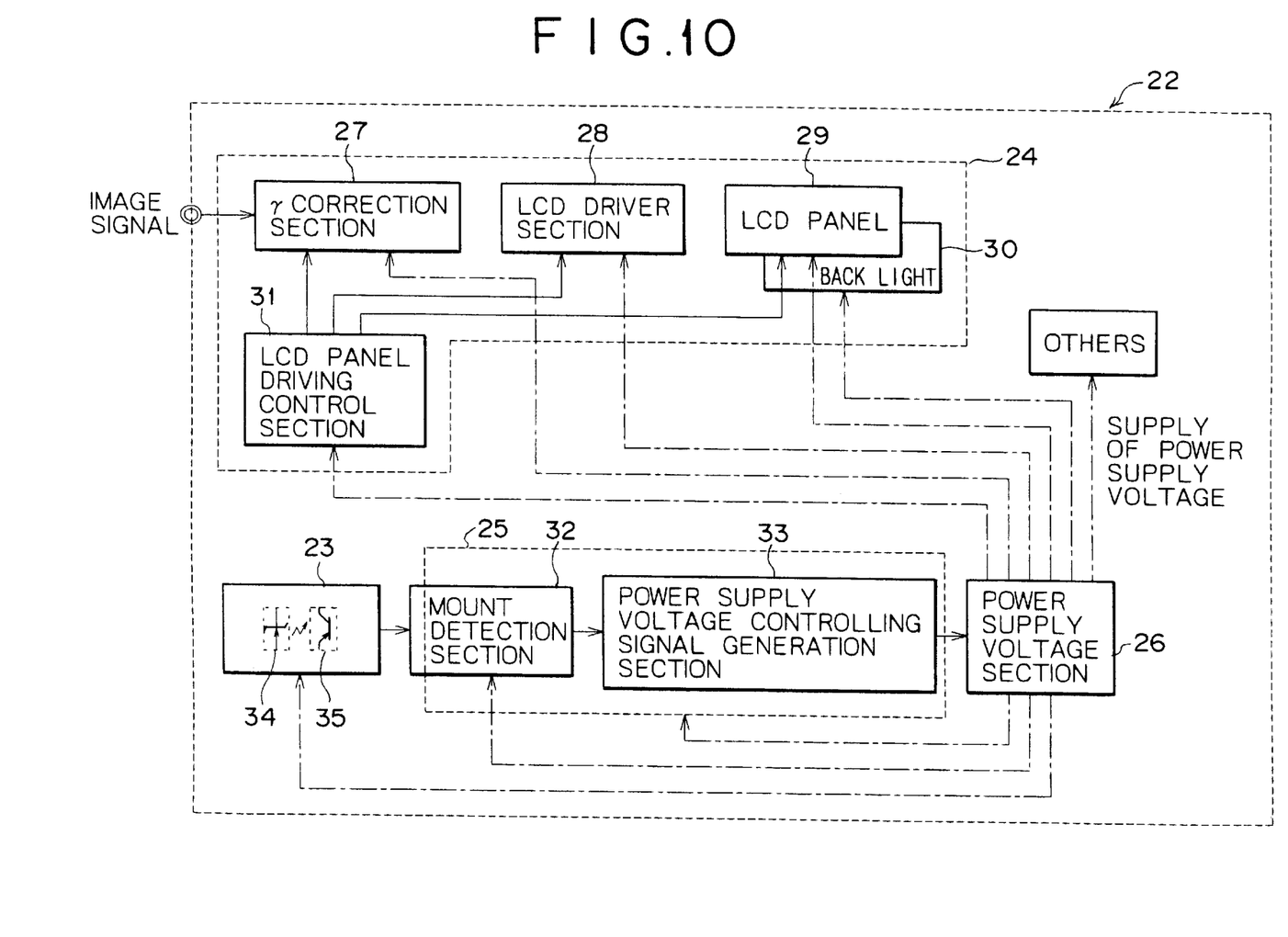
FIG. 10 is a block diagram showing the image displaying housing of FIG. 9 when a power supply voltage is supplied to components of the image displaying housing.

FIG. 10 shows the image displaying housing 22 of FIG. 9 when the user looks into the LCD panel 29 of the image displaying sections 24. In order to allow a displayed image formed on the LCD panel 29 to be observed by the user, a power supply voltage is applied to all blocks of the γ correction section 27, LCD driver section 28, LCD panel 29, back light 30 and LCD panel driving control section 31 of each of the image displaying sections 24. The voltage is supplied also to the sensor section 23 and the voltage control section 25 so that the condition wherein the eyes of the user look away from the displayed image may be detected at any time.

Figure 11:
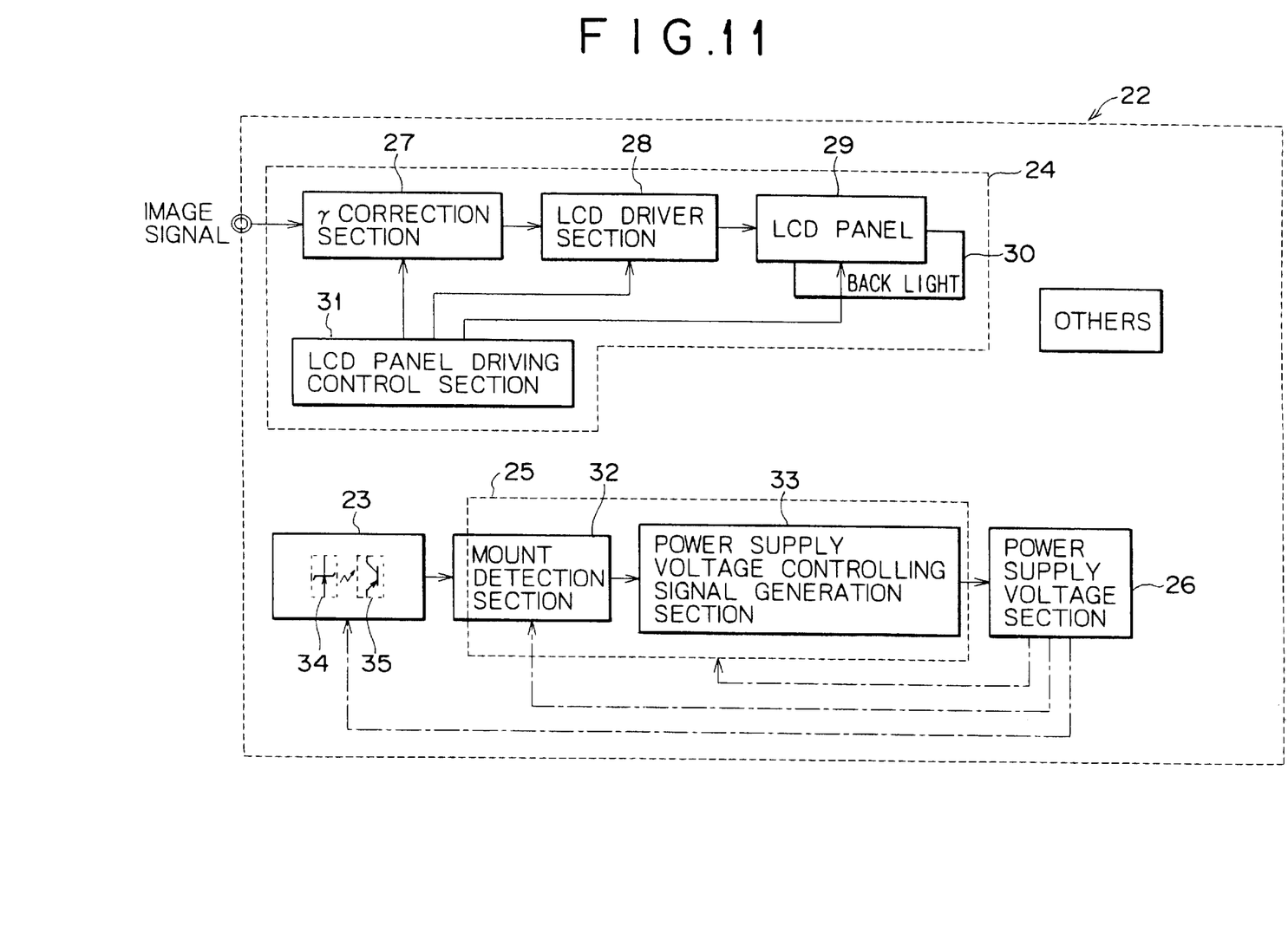
FIG. 11 is a block diagram showing the image displaying housing of FIG. 9 when a power supply voltage is supplied to only required one of the components of the image displaying apparatus.

FIG. 11 shows the image displaying housing 22 of FIG. 9 when the user looks away from an image formed on the LCD panel 29 of each of the image displaying sections 24. When the eyes of the user stop looking at and now look away from the image, supply of the power to the blocks which are required to display an image, that is, to the image displaying sections 24, is interrupted. In the meantime, the power supply voltage continues to be supplied to those blocks which are required at least to detect that the eyes look away from a displayed image, that is, at least the sensor section 23 and the voltage control section 25 (that is, the detection means) of the head mounted display apparatus of FIG. 9. Further, supply of the power supply voltage to any other component of the head mounted display apparatus which does not contribute to the detection described above is interrupted. Naturally, if the user looks into the LCD panel 29 of each of the image displaying sections 24 again, then this is detected by the detection means and supply of the power supply voltage to those components to which the power supply has interrupted is restored so that all components of the head mounted display apparatus are rendered operative.

Since, if it is detected that the eyes of the user stop looking at and now look away from the LCD panel 29 of each of the image displaying sections 24, supply of the power supply voltage is switched automatically so that the power supply voltage may thereafter be supplied only to those minimum circuit components which are required to be operative to allow such a detection operation as described above, the power consumption can be reduced. Consequently, the head mounted display apparatus which is driven by a battery is very advantageous and effective in that the life of the power supply increases and use for a longer period of time is allowed.

As described above, the detection sector serving as detection means for detecting whether or not a displayed image is observed by the user's eyes can take various forms. Several different forms of the detection means are shown in FIGS. 2 to 4.

Figure 2:
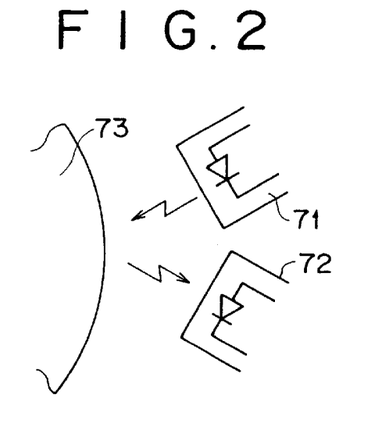
FIGS. 2 to 4 are schematic illustrations showing different forms of a sensor section for detecting a mounted condition of a head mounted display apparatus.

FIG. 2 shows a form of the detection section. Referring to FIG. 2, the detection section shown includes an infrared ray emitting element 71 and an infrared ray receiving element 72. An infrared ray emitted from the infrared ray emitting element 71 strikes and is reflected by the forehead 73 of the user. The reflected infrared ray is received by the infrared ray receiving element 72.

Figure 3:
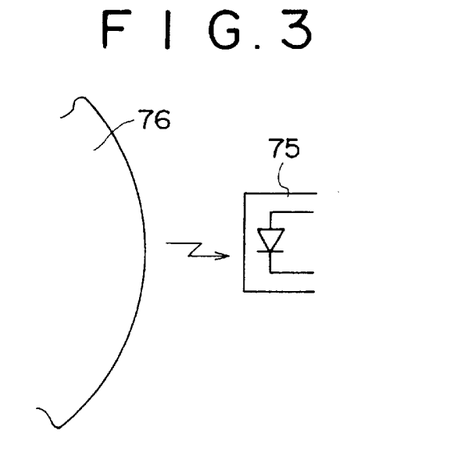

FIG. 3 shows another form of the detection section. Referring to FIG. 3, the detection section shown includes an infrared ray receiving element 75, but does not include an infrared ray emitting element. The infrared ray receiving element 75 receives an infrared ray radiated from the forehead 76 of a human being. In particular, the infrared ray receiving element detects an infrared ray radiated from the forehead of the user.

Figure 4:
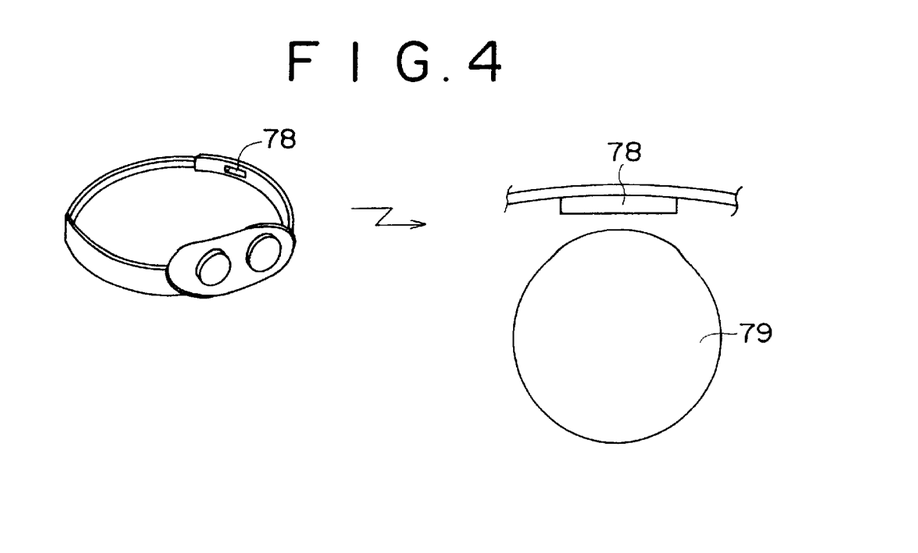

FIG. 4 shows a further form of the detection section. Referring to FIG. 4, the detection section shown includes a pressure-sensitive element 78 such as a piezoelectric element which detects a pressure under which the pressure-sensitive element 78 is pressed against the head 79 of the user.

Where a pressure-sensitive element is employed in this manner, preferably the head mounted display apparatus is constructed such that it is mounted on the head of the user not by means of temples but by means of a belt or band as shown in FIG. 4. The pressure-sensitive element of the detection section is mounted suitably on the belt such that it is pressed against and detects a pressure from the head of the user when the head mounted display apparatus is mounted on the head. Naturally, the pressure-sensitive element may be mounted on the pad 53 of the head mounted display apparatus 50 or the pad 63 of the head mounted display apparatus 60 described hereinabove with reference to FIG. 7 or 8.

While preferred embodiments of the present invention have been described using specific terms, such description is for illustrative purpose only, and it is to be understood that changes and variations may be made without departing from the spirit or scope of the following claims.

What is claimed is:

1. A power supply voltage controlling method for a head mounted display unit comprising an image displaying section for being mounted on the head of a user and positioned in front of the eyes of the user, said image displaying section containing circuit components necessary to form an image to be displayed, a power supply section for supplying a power supply voltage, and a control section for controlling the power supply voltage to be supplied from said power supply section, comprising the steps of:

detecting whether or not the eyes of the user look away from said image displaying section; and interrupting, when it is detected that the eyes of the user look away from said image displaying section, the supply of the power supply voltage to the circuit components necessary to form an image to be displayed in said image displaying section while the detection operation in the detecting step remains operative by continued supply of the power supply voltage.

2. A power supply voltage controlling method according to claim 1, wherein, in the detecting step, whether or not the eyes of the user look away from said image displaying section is detected by detecting an infrared ray irradiated upon and reflected from or radiated from the forehead of the user in the proximity of the eyes.

3. A power supply voltage controlling method according to claim 1, wherein, in the detecting step, whether or not the eyes of the user look away from said image displaying section is detected by detecting a pressure under which the head mounted display unit is pressed against a portion of the body of the user in the proximity of the eyes.

4. A head mounted display apparatus, comprising:
  an image displaying section for being mounted on the head of a user and positioned in front of the eyes of the user, said image displaying section containing circuit components necessary to form an image to be displayed;
  a power supply section for supplying a power supply voltage;
  a control section for controlling the power supply voltage to be outputted from said power supply section; and
  detection means for detecting whether or not the eyes of the user look away from said image displaying section;
  said control means controlling said power supply section to interrupt, when said detection means detects that the eyes of the user look away from said image displaying section, the supply of the power supply voltage to the circuit components necessary to form an image to be displayed in said image displaying section while continuing the supply of the power supply voltage to said detection means.

5. A head mounted display apparatus according to claim 4, wherein said detection means is positioned so as to detect an infrared ray irradiated upon and reflected from or radiated from the forehead of the user in the proximity of the eyes.

6. A head mounted display apparatus according to claim 4, wherein said detection means is positioned so as to detect a pressure under which said head mounted display apparatus is pressed against the head of the user.

* * * * *